Nov. 19, 1957  G. H. MARMONT  2,814,000
ILLUMINATION CONTROL DEVICE AND SYSTEM
Filed March 19, 1954  2 Sheets-Sheet 1

George H. Marmont
INVENTOR.
BY
Attorney

Nov. 19, 1957  G. H. MARMONT  2,814,000
ILLUMINATION CONTROL DEVICE AND SYSTEM
Filed March 19, 1954  2 Sheets-Sheet 2
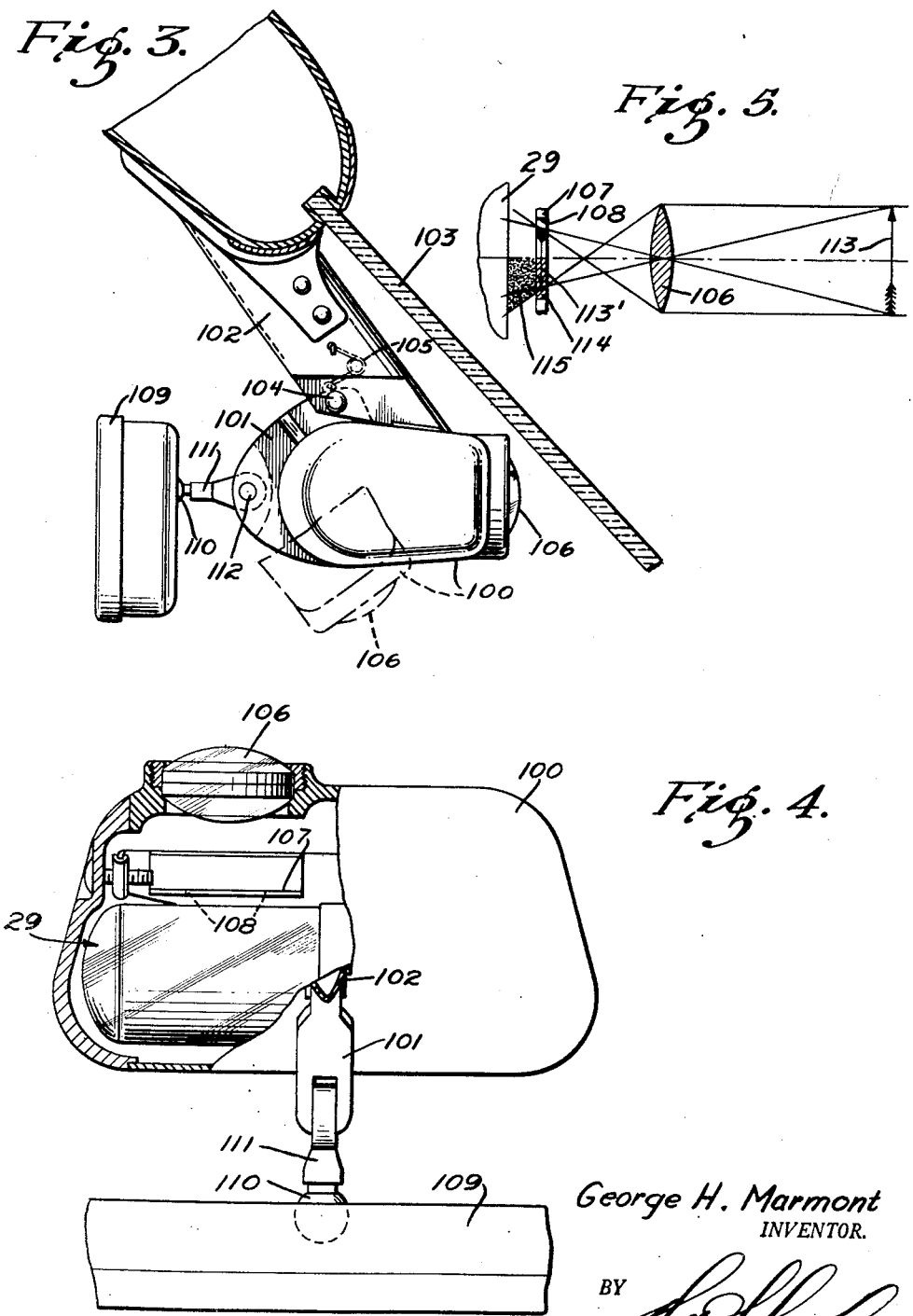
George H. Marmont
INVENTOR.
BY
Attorney ized through the electrical system of the automobile to relatively excessive high power drain.

United States Patent Office 2,814,000
Patented Nov. 19, 1957

2,814,000

ILLUMINATION CONTROL DEVICE AND SYSTEM

George H. Marmont, Los Angeles, Calif., assignor to McCulloch Motors Corporation, Los Angeles, Calif., a corporation of Wisconsin Application March 19, 1954, Serial No. 417,476

6 Claims. (Cl. 315—83)

The present invention relates generally to an illumination control device and system, and is more particularly concerned with light sensitive control for switching the headlights of a vehicle from one degree of illumination to another, depending upon the intensity of the illumination of an approaching vehicle.

Heretofore, it has been common practice to arrange the illumination systems of automotive vehicles with dual filament lamps for the vehicle headlights, each filament being separately energizable through electric circuits controlled by the operator. The filaments in each headlight are so positioned with respect to a reflector that the operator may select a high bright beam or a low dim beam for different driving conditions.

The utilization of the high bright beam presents a hazard when passing another vehicle due to the glare and dazzling effect of the high beam. The operator is thus required to manually operate his switch which selectively energizes the low beam circuit. Such operation, since it is a manual operation, may distract the operator's attention during a time when extremely hazardous conditions prevail.

In order to overcome the disadvantages of the manually controlled beam shift, several arrangements have been suggested by which the beam of a vehicle may be automatically shifted to the low or dim beam, upon approach of another vehicle. For the most part, the suggested systems have utilized some form of light sensitive means and have in the main been rather complex in that they utilize a number of electronic tubes, and subject the electrical system of the automobile to relatively excessive high power drain.

In the present invention, it is proposed to utilize devices which will more efficiently control the lighting than in a manual system, which will greatly simplify present systems, and which requires relatively low power drain on the electrical system.

A further object of the invention is to provide automatic control for shifting the headlights of a vehicle from one degree of illumination to another, wherein, a unique electrostrictive relay is utilized, such relay being sensitive to a charging potential obtained from a current carrying resistor.

Another object of the invention is to provide in an illumination control system for vehicles, improved means for developing a holding voltage for a sensitive control relay which determines the system operation.

Another object is to provide in a device of the character described, an improved optical arrangement for eliminating control effects from sky light and other extraneous light emanating from sources other than an approaching vehicle.

Still another object is to provide in a system embodying the features of the herein described invention, improved pick-up means for positioning and adjusting the light ray intercepter so that light rays may be intercepted from the front of the vehicle as well as the rear of the vehicle.

Briefly, the present invention comprises a pick-up device adapted to be mounted adjacent the upper margin of the vehicle windshield in a position where it may intercept light rays approaching the vehicle both from the rear and from the front. The rear light rays are intercepted by an adjustable mirror surface, whereas the forward or front light rays are intercepted by light sensitive means in a circuit connected with an alternating current source of supply, the light sensitive means when light activated being adapted to pass current in one direction. In circuit with the light sensitive means in a resistor which is arranged to provide a charging potential for an electrostrictive relay having contacts operable at a predetermined value of potential to close a circuit and actuate switching means which automatically switches the vehicle lights from one degree of illumination to another.

Further objects of the invention will be brought out in the following part of the specification, wherein detailed description is for the purpose of fully disclosing the invention without placing limitations thereon.

Referring to the accompanying drawings, which are for illustrative purposes only:

Fig. 3 is a side elevational view of the pick-up device containing the light sensitive means constituting a part of the herein described invention;

Fig. 4 is an enlarged fragmentary plan view of the device shown in Fig. 3, portions being cut away to show details of mounting of the light sensitive means and associated parts; and Fig. 5 is a view diagrammatically illustrating features of the optical system of the pick-up device.

Figure 1:
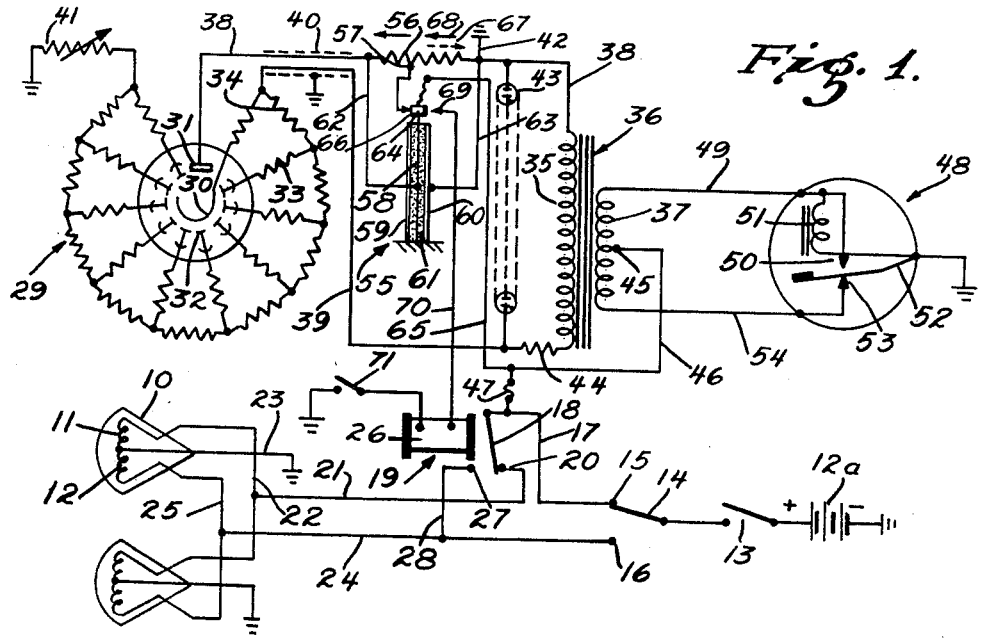
Fig. 1 is a schematic diagram of the circuit connections utilized in the present invention for controlling the headlights of a vehicle.

Referring now to Fig. 1 of the drawings, there is illustrated a vehicle headlight system embodying the present invention in which a pair of conventional vehicle headlights 10 are diagrammatically shown, each of these headlights being provided with high and low beam filaments 11 and 12 respectively. The filaments of the headlights are connected into electrical circuits energizable to provide either a manual or automatic control of the system.

A conventional storage battery 12a, which may be the conventional ignition battery of the vehicle with either the position or negative side grounded, is utilized as a source of electric power. In the present embodiment, the negative side of the battery is shown as being grounded, while the positive side is connected through a light control switch 13 arranged for manual manipulation by the operator of the vehicle. From the light switch, the feed circuit is carried to a dimmer switch 14 which is single-pole double-throw and arranged to connect the electric circuit with a contact 15 for energizing the high filament 11, and with a contact 16 for energizing the low filament 12. More specifically, the high filament 11 is normally energizable through a circuit as follows: From contact 15, through a conductor 17, a movable arm 18 of a relay 19, through a normally closed contact 20, conductor 21, conductor 22, through the filament 11, and thence through a conductor 23 to ground.

Upon movement of the switch 14 into engagement with contact 16, the low filament is energized through a circuit as follows: From contact 16, through conductor 24, conductor 25, the filament 12, and thence through conductor 23 to ground.

The relay 19 is utilized for switching automatically from the circuit in which the high filament 11 is energized to the energizing circuit of the low filament 12 in response to a predetermined intensity of illumination of an approaching vehicle headlight. The relay 19 has an energizing coil 26 which operates upon being energized to move the arm 18 out of engagement with contact 20 and into engagement with a contact 27 which is connected through a conductor 28 with conductor 24 so that the low filament 12 will now be energized while the switch 14 remains in engagement with contact 15.

The automatic control features of the system will now be described. A light sensitive device is positioned on the vehicle at a suitable location to intercept light rays which may emanate from an approaching vehicle. In the present invention, the light sensitive device, as generally indicated at 29, consists of a photo-multiplier tube having a photo-cathode 30 arranged to be activated by incident light from an approaching vehicle, an anode 31 and a plurality of dynodes 32 which are respectively connected through a protective resistor 33 to a resistor network in which a plurality of resistors 34 serve to divide the applied voltage between the dynodes. The photo-multiplier tube is shown as being connected to a secondary winding 35 of a transformer, generally indicated by the numeral 36, and having also a primary winding 37. The ends of the secondary winding 35 are connected through conductors 38 and 39 respectively with the anode 31 and the photo-cathode 30, these conductors being shown as being carried through a grounded sleeve or conduit 40.

The last dynode is connected through a sensitivity adjusting resistor 41 to ground, and with the conductor 38 grounded through a connection 42, it will be seen that the voltage from the secondary winding 35 will be applied to the resistor network with which the dynodes are connected. Since photo-multiplier tubes are sensitive to voltage variations, stability is established by regulating the output voltage from the winding 35 of the transformer. This may be accomplished in various ways, but in the present instance is shown as incorporating a plurality of neon tubes 43 which are connected in series between conductors 38 and 39 so as to be positioned across the secondary winding and a series connected current limiting resistor 44.

The primary winding 37 is provided with a central tap 45 which is connected through a conductor 46 and protective fuse 47 with conductor 17, so that during energization of the high filament 11, the central tap of the primary winding will be connected to one side of battery 12a, while a vibrator 48 is operative to alternately connect the opposite ends of the primary winding 37 to the other side of the battery. One end of the primary winding 37 connects through a conductor 49 to the vibrator contact 50 and one terminal of the vibrator operating coil 51, the other terminal of the operating coil being connected with movable arm 52 shown as being grounded and normally engaging a contact 53 which is connected through conductor 54 with the other side or end of the primary winding 37.

Operation of the vibrator 48 applies a pulsating direct current to the primary winding 37 of the transformer, these pulsations acting in the transformer to produce a stepped up high voltage of alternating character at the connections with the secondary winding 35. The photo-multiplier tube 29, when activated, permits current flow in the output circuit of the secondary winding of the transformer in one direction only, since the photo-multiplier tubes acts as a rectifier.

This current flow is utilized to actuate a sensitive relay 55 of electrostrictive type, which is arranged to be charged from the potential developed across a resistor 56 connected in the conductor 38. In the disclosed arrangement, this resistor is shown as having a top connection 57 between its ends.

The electrostrictive relay is diagrammatically represented as comprising a brass shim 58 which is positioned between and separated from spaced plates 59 and 60 of foil or metal construction, a layer 61 of barium titanate ($BaTiO_3$) being interposed between the respective plates 59 and 60, and the metal shim 58. The shim 58 is connected by a conductor 62 to one end of resistor 56, while one of the plates, in this instance, plate 60, is connected by conductor 63 to the other end of resistor 56.

The shim 58 and plate 60 are thus in the nature of a condenser which is charged to the potential across the resistor 56, and the barium titanate has a characteristic of contracting in a direction normal to the voltage gradient applied between the plates. This causes the plate assembly to deflect under potential changes. The shim 58 is provided with a contact 64, which is insulatingly supported and normally connected with the fuse 47 through a conductor 65. In the normal position of the plate assembly, the contact 64 engages a normally closed contact 66 having connection with the tap 57 so as to normally produce a current flow through one section of the resistor 56 in a direction indicated by the arrow 67 which is in opposition to normal flow through the resistor in the direction indicated by the full line arrow 68. The potential across the resistor 56, which is applied to the shim 58 and plate 60 is therefore dependent upon the current difference between the current flowing through the photo-multiplier tube, and current from the battery source 12a.

When the potential drop across the resistor 56 reaches a predetermined designed amount, the plate assembly deflects to move the contact 64 out of engagement with the normally closed contact 66 and into engagement with a contact 69 having connection through a conductor 70 with one side of the coil 26 of relay 19. The other terminal of the coil 26 is connected through an override switch 71 to ground so as to complete an energizing circuit from the battery 12a, when the contacts 64 and 69 are in engagement.

Energization of the coil 26 of relay 19 causes it to attract the movable arm 18 and thus switch from contact 20 to contact 27 and thus change the degree of illumination of the vehicle headlights from high filament to low filament.

When the incident beam which activates the photo-cathode 30 of the photo-multiplier tube is withdrawn, the reduced potential across the resistor 56 permits restoration of the sensitive relay 55 to normal position in which the coil 26 is deenergized and the high filament 11 is again connected in circuit.

When the contact 64 engages contact 69, it will be observed that the contact 66 is disengaged so that the previous current flow from the battery 12a in opposition to normal current flow in the resistor 56 is withdrawn. As a consequence, the current flow through the resistor 56 is increased. This causes an increased potential drop across the layer 61 separating the shim 58 and plate 60 and thus forms an increased holding voltage to assure that the relay remains in operative position until the incident beam which actuated the photo-multiplier tube is withdrawn.

Figure 2:
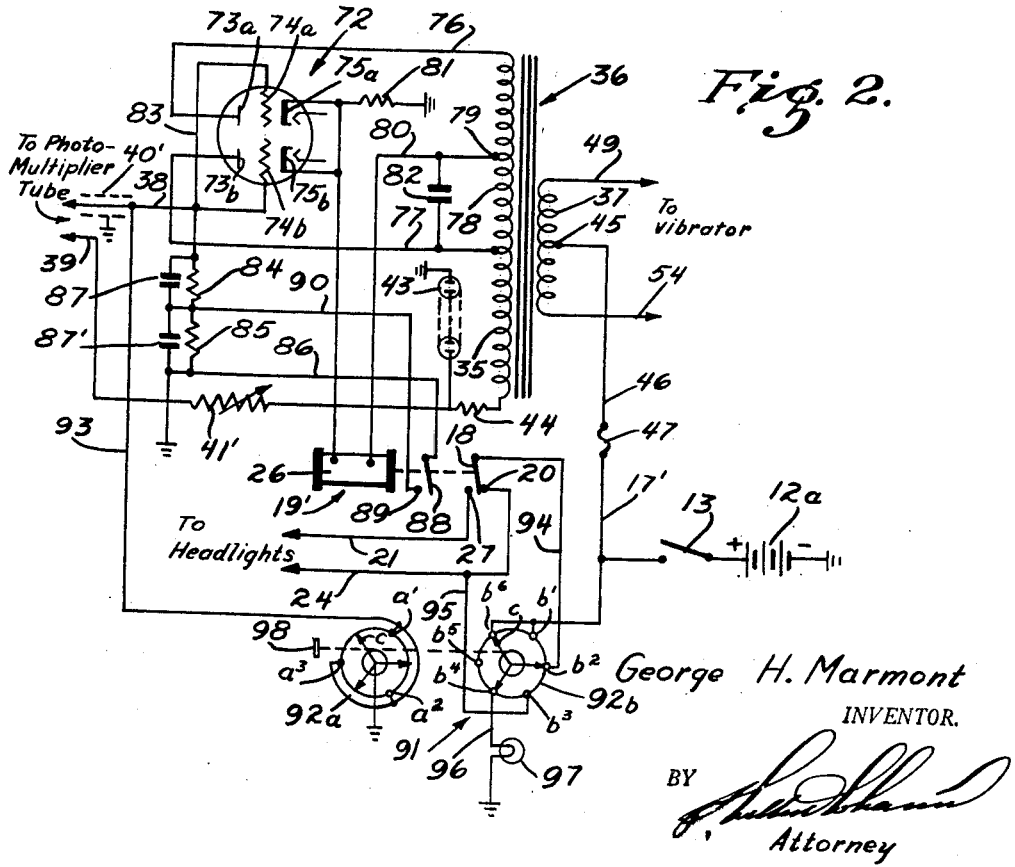
Fig. 2 is a schematic diagram of a modified system embodying the present invention.

In the arrangement described above, the switching operation is made responsive to the operation of a voltage sensitive electrostrictive relay 55. As a modified system, it is proposed, as shown in Fig. 2, to provide an arrangement which in this case utilizes a current sensitive relay. Utilization of this type of relay entails a somewhat additional loading on the transformer 36, but still continues to utilize a simplified circuit in comparison to known circuits which have been utilized for the control of vehicle illumination in the manner contemplated herein.

In Fig. 2, elements similar to those used in Fig. 1 have been indicated by corresponding numerals. It will be observed that in general the system circuit is very similar to that of Fig. 1. The primary distinction, however, resides in the utilization of a double-triode tube 72, one of the triodes having an anode or plate 73a, a grid 74a and a cathode 75a, whereas the other triode has an anode or plate 73b, a grid 74b and cathode 75b. The plates of this tube are respectively connected through conductors 76 and 77 with an extension winding 78 which forms a part of the secondary winding of the transformer, this extension having a mid-tap 79. The plate circuits of the tube 72 are completed through a connection 80 between the tap 79 and the cathodes 75a and 75b. The cathodes are shown as being connected with ground through a cathode bias resistor 81 which protects the tube 72 against excessive current during periods of no signal or when the grids are grounded.

The relay 19', in this instance, has its operating coil 26 inserted into connection 80 so that current flowing therethrough will energize the coil. A capacitor (not shown) may be connected across the relay coil 26 so as to smooth out the current peaks and make the relay more stable in its operation. A capacitor 82 is also connected between conductors 77 and 80 to form a buffer which minimizes arcing in the vibrator contacts.

The grids 74a and 74b are interconnected by a conductor 83 and with ground through a common control circuit including series resistors 84 and 85. The resistors 84 and 85 are shunted by capacitors 87 and 87' respectively which in addition to smoothing out the ripples in the grid control circuit, also introduce a slight delay e. g. one-tenth second ($\frac{1}{10}$) between the time that an incident light beam is received by the photo-multiplier tube and the time of actuation of the relay 19'. The capacitors 87 and 87' stabilize the operation so that the relay does not operate in response to small changes in light intensity striking the photo-multiplier tube.

In the arrangement shown in Fig. 2, it will be observed that in this modification, the conductor 38 is connected with the control grids 74a and 74b at their juncture with the resistor 84. As thus connected, the activated photo-multiplier tube permits of a flow of current through the resistors 84 and 85 in such manner as to bias the tube 72 to point of cutoff, for a purpose which will be explained subsequently. In this arrangement the conductor 38 only is shown as being shielded by a sleeve 40'.

It will be observed that the relay 19' has an additional movable arm 88 which is arranged upon energization of the relay to engage with a contact 89 to form a short circuit connection around resistor 85 from conductor 86 through a conductor 90. It will be noted also that in the modified arrangement the movable arm 18 in its normal position engages contact 20 which is connected to the low filaments of the headlights whereas contact 27 is in this case connected with the high filaments of the headlights.

A foot switch, as generally indicated by numeral 91, is utilized to change the operating characteristics of the control system. This switch is a combination override switch and control locking switch. It is illustrated diagrammatically as including a switching section 92a, and a switching section 92b.

The switching section 92a has a plurality of fixed contacts $a^1$, $a^2$ and $a^3$ having an angular circumferential spacing of 120 degrees, and adapted to be successively engaged and disengaged by rotatably mounted multiple contacts c which likewise have a spacing of 120 degrees. The contacts $a^1$, $a^2$ and $a^3$ are connected through a conductor 93 with conductor 38, while the contacts c are shown as being grounded.

The switching section 92b is in a similar manner provided with a plurality of fixed contacts $b^1$, $b^2$, $b^3$, $b^4$, $b^5$ and $b^6$, except that these contacts are circumferentially spaced at 60 degree intervals, while its rotatable contacts c have a spacing of 120 degrees, this being the same as in switching section 92a. Contacts $b^1$ and $b^6$ are connected with the circuit of battery $12^a$ and fuse 47 through a conductor 17'. Contact $b^2$ is connected through conductor 94 with the movable arm 18. Contact $b^3$ is connected by a conductor 95 with conductor 24. Contact $b^4$ is grounded through a conductor 96 having an indicating pilot lamp 97 therein. Contact $b^5$ is unconnected.

A manually operable member 98, which may be a foot treadle or the like, is connected with the rotatably mounted contacts c of the switching sections 92a and 92b through a conventional ratchet mechanism so that each time the member 98 is depressed, it will actuate the contacts c of each switching section through an angle of 60 degrees. It will therefore be apparent that with alternate depressions of the member 98, the switching section 92a will operate to connect and disconnect the conductor 93 with ground. With the conductor 93 grounded, a connection is established between the grids and cathodes of the tube 72, so that the tube will conduct independently of the condition of the photo-multiplier tube 29.

With the switch 13 closed, and the contacts c of switching section 92a in a position wherein the conductor 93 is ungrounded, the contacts c will be in the position shown. In this position, the battery 12a is connected with the movable arm 18 and an energizing circuit for the pilot lamp 97. This is the automatic control position, wherein the operation of the relay 19' will act to control the condition of vehicle illumination depending upon the activation of the photo-multiplier tube 29.

Upon movement of member 98 to change the switching section 92a so as to ground conductor 93, the contacts c of switching section 92b will be shifted 60 degrees, and in this position will operate to disconnect the arm 18 from the battery and connect the battery to conductor 24 to provide low filament energization of the headlights.

While this arrangement may utilize a sensitivity adjustment resistor 41, as shown in Fig. 1, such resistor may be omitted and a sensitivity adjusting resistor 41' placed in the conductor 39, as shown in Fig. 2, for such purpose.

The operation of this form of the invention will now be described. With no incident beam falling on the photo-multiplier tube, the resistors 84 and 85 do not provide a bias on the grids of the tube 72, so that with the switch 13 closed and switch 91 set for automatic control, as shown, the triodes will conduct during each alteration of the alternating current from the winding 78 of the secondary of the transformer 36. A flow of current thus takes place which will energize the coil 26 of relay 19' and cause it to operate, shifting the arm 18 so that it contacts or engages with contact 27 to energize the high filament of the headlights, and move arm 88 into engagement with contact 89 so as to short out the resistor 85. Shorting out of the resistor 85 under such circumstances will not change the bias, but should current be flowing through the photo-multiplier tube due to an incident beam of light, then the shorting will cause a decrease in the value of the grid biasing resistors and thus make the bias potential more positive. There is then less possibility of the relay 19' kicking out with minor fluctuations and the relay 19 will be actuated with a snap action.

With an incident beam activating the photo-multiplier tube, current will flow through this tube through a circuit from tap 79 of the transformer secondary through conductor 80, coil 26, resistor 81 to ground, resistor 84, through conductor 38, from the plate of the photo-multiplier tube to the cathode thereof, the conductor 39, resistor 41' and thence through resistor 44 back to the secondary of the transformer 36. As this current flow increases, the bias of the tube 72 will be forced past cutoff, whereupon the tube 72 will cease to conduct and the relay 19' will be deenergized and permit the movable arm 18 to move into engagement with contact 20 and thus change the headlights from high filament to low filament illumination.

Referring now to Figs. 3 and 4, the pick-up device, which serves as a mounting for the light sensitive means, will now be explained. As best shown in Fig. 4, the photo-multiplier tube of the light sensitive means 29 is located within a housing structure 100 which is provided between its ends with an upstanding rib 101 which is carried along the back side of the housing and extends over the top surface thereof. The housing may be supported from a depending mounting bracket 102 which is adapted at one end for connection with the vehicle top adjacent the upper margin of a windshield 103 thereof, the other end of the bracket having a straddling association with the rib 101 and being pivotally connected thereto as by means of a pivot 104 which permits swinging movement of the housing in a vertical plane. Moreover, the bracket 102 and housing 100 are interconnected by a spring 105 one end of this spring being anchored to the bracket 102 and the other end to the housing 100, so that when the housing is tilted or swung from a normal position as shown in Fig. 3, to a position shown in dotted lines wherein the forward side of the housing is downwardly disposed, the spring moves past a dead center position and acts to bias the housing to either its position of use or the latter position described above.

The housing 100, at its forward edge mounts a light concentrating lens 106 which is adapted to gather incident light from an approaching vehicle and direct it through a mask 107 in which a mask opening 108 permits the light to enter the photo-sensitive device.

In the normal position of the housing 100, as shown in full lines in Fig. 3, the lens 106 is adapted to intercept light rays approaching the vehicle from its front. Swinging movement of the housing 100 to a position wherein the forward edge is disposed downwardly facilitates cleaning of the lens, when required.

The housing 100 is further utilized as a mounting for a rear view mirror 109 of conventional construction. This mirror has a ball and socket connection 110 with a supporting arm 111 which permits universal adjustment of the mirror. As shown in Fig. 3, the arm 111 has its other end connected to the associated rib 101 for vertical swinging movement about a pivot 112. The mirror 109 will thus intercept light rays approaching the vehicle from the rear.

The pick-up device described above provides a compact mounting for light interceptive means for light rays approaching the front of the vehicle, as well as light rays approaching from the rear of the vehicle, the mounting of the device being flexible to permit adjustment of the mirror and convenient tilting of the housing 100 for cleaning the lens 106.

Referring now to Fig. 5, an important feature of the optical system of the invention is diagrammatically illustrated. In this view, the light concentrating lens 106 is shown as being arranged so as to focus a distant object such as an arrow 113 in an inverted position within the plane of the mask 107 so as to form the image 113'.

The concentrated light from the lens 106 is projected to the light sensitive device 29 after passing through the mask opening 108. The lower portion of the opening 108 which is of rectangular configuration is provided in its lower half with a filter 114 of appropriate material and color to attenuate light rays emanating from a source disposed above the axis of the lens 106, as for example skylight at dusk or light beams from other sources than an approaching vehicle.

The attenuated light rays are indicated by the shaded portion, as indicated by numeral 115.

Various modifications may suggest themselves to those skilled in the art without departing from the spirit of my invention, and, hence, I do not wish to be restricted to the specific form shown or uses mentioned, except to the extent indicated in the appended claims.

I claim:

1. Automatic control for vehicle headlights, comprising: a transformer having a primary winding with a tap connection, and a secondary winding; a source of direct current having one side connected to said tap connection; means for alternately connecting the other side of said source to the opposite ends of said primary winding; light sensitive means connected to said secondary winding and adapted under light activation to form a conducting path for said winding; a resistor in said path having a tap connection; an electrostrictive relay responsive to potential changes across said resistor, said relay having a set of normally closed contacts, and a set of normally open contacts; and a circuit from said direct current source connected by the normally closed contacts so as to pass current in opposition to current flow in a portion of said resistor; and means controlled by the actuation of said relay to close its normally open contacts for switching said vehicle lights from one degree of illumination to another when the effective potential across said resistor reaches a predetermined value, the opening of said normally closed contacts acting to disconnect the opposing current flow, whereby the potential drop across said resistor is increased to provide a higher relay holding voltage.

2. Automatic control for vehicle headlights, comprising: a transformer having a primary winding with a tap connection and a secondary winding; a source of direct current having one side connected to said tap connection; means for alternately connecting the other side of said source to the opposite ends of said primary winding; light sensitive means connected to said secondary winding and adapted under light activation to form a conducting path for said winding; a resistor in said path; an electrostrictive relay responsive to potential changes across said resistor; and means controlled by said relay for switching said vehicle lights from one degree of illumination to another when the potential across said resistor reaches a predetermined value.

3. Automatic control for vehicle headlights, comprising: a transformer having a primary winding with a tap connection, and a secondary winding; a source of direct current having one side connected to said tap connection; means for alternately connecting the other side of said source to the opposite ends of said primary winding; light sensitive means connected to said secondary winding and adapted under light activation to form a conducting path for said winding; a resistor in said path; an electrostrictive relay responsive to potential changes across said resistor; means controlled by said relay for switching said vehicle lights from one degree of illumination to another when the potential across said resistor reaches a predetermined value; and means responsive to the actuation of said relay for increasing the potential drop across said resistor, whereby an increased holding potential is applied to said relay.

4. Automatic control for vehicle headlights, comprising: a transformer having a primary winding with a tap connection, and a secondary winding; a source of direct current having one side connected to said tap connection; means for alternately connecting the other side of said source to the opposite ends of said primary winding; light sensitive means connected to said secondary winding and adapted under light activation to form a conducting path for said winding; a resistor in said path; and relay means for switching said vehicle lights from one degree of illumination to another, including an actuating element responsive to changes in potential across said resistor.

5. Automatic control for vehicle headlights, comprising: an alternating current power source; light sensitive means in a circuit connected to said source, and adapted under light activation to pass current in one direction from said source; a resistor in said circuit; and electrostrictive relay means charged by the potential across said resistor, and operative upon said potential reaching a predetermined value to switch said vehicle lights from one degree of illumination to another.

6. Automatic control for vehicle headlights, comprising: an alternating current power source; light sensitive means in a circuit connected to said source, and adapted under light activation to pass current in one direction from said source; a resistor in said circuit; and a relay for switching said vehicle lights from one degree of illumination to another, including a sensitive actuating element responsive to changes in potential across said resistor.

References Cited in the file of this patent

UNITED STATES PATENTS

| | | |
|---|---|---|
| 1,946,681 | Frappier et al. | Feb. 13, 1934 |
| 1,999,527 | Ronning | Apr. 30, 1935 |
| 2,086,865 | Gustafson | July 13, 1937 |
| 2,182,987 | Hopkins | Dec. 12, 1939 |
| 2,207,097 | Logan | July 9, 1940 |
| 2,476,389 | Schmidt | July 19, 1949 |
| 2,558,969 | Le Croy | July 3, 1951 |
| 2,560,748 | Silva | July 17, 1951 |
| 2,730,654 | Rabinow | Jan. 10, 1956 |